G. V. SEARS.
RIM TOOL.
APPLICATION FILED FEB. 18, 1919.
1,417,863.
Patented May 30, 1922.
2 SHEETS—SHEET 1.
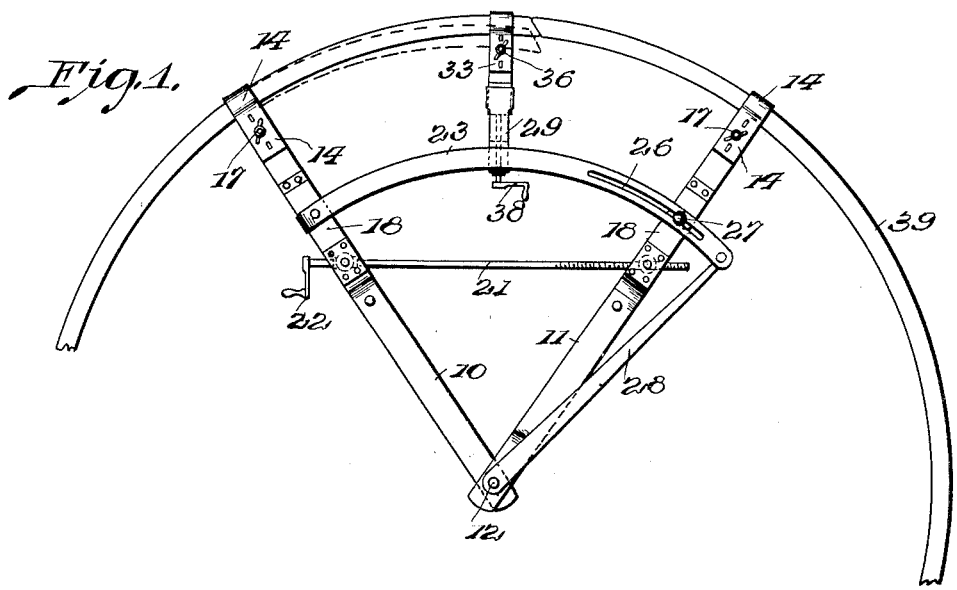
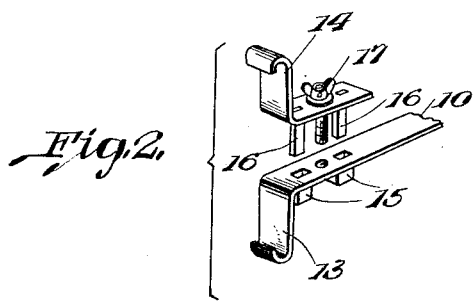
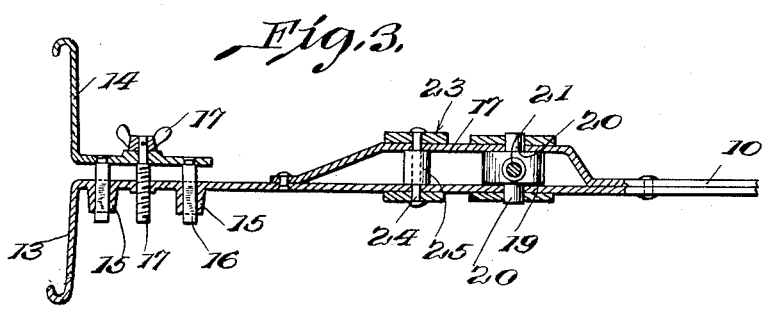
INVENTOR.
G. V. Sears,
BY
Lacey & Lacey,
ATTORNEYS

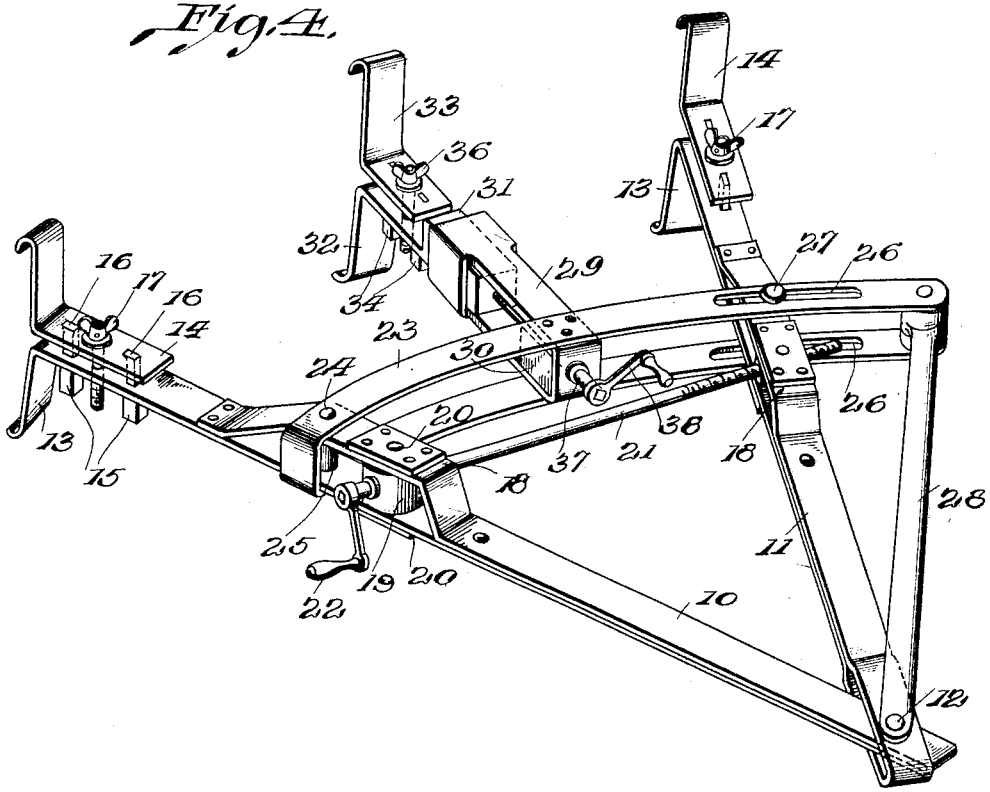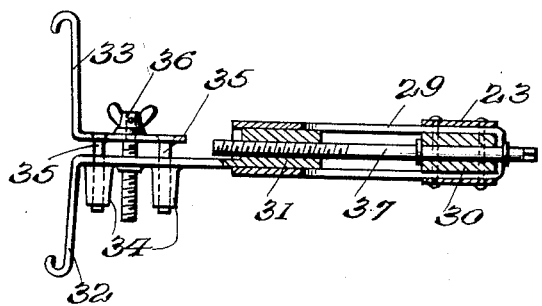

UNITED STATES PATENT OFFICE.

GEORGE V. SEARS, OF BINGHAM CANYON, UTAH.

RIM TOOL.

1,417,863.

Specification of Letters Patent.  Patented May 30, 1922.

Application filed February 18, 1919. Serial No. 277,788.

*To all whom it may concern:*

Be it known that I, GEORGE V. SEARS, a citizen of the United States, residing at Bingham Canyon, in the county of Salt Lake and State of Utah, have invented certain new and useful Improvements in a Rim Tool, of which the following is a specification.

This invention relates to an improved wheel rim contractor and has as its primary object to provide a device of this character particularly designed for use in contracting the split demountable rims of motor vehicles so that a tire may be readily placed upon or removed from the rim.

The invention has as a further object to provide a device which, after being applied, may be first operated for moving the ends of the rim out of register and may then be operated for contracting the rim and thus shifting the rim ends into overlapping relation so that a tire will fit freely over the rim.

And the invention has as a still further object to provide a device which may be quickly and easily applied and operated with like facility.

Other and incidental objects will appear hereinafter. In the drawings:

Figure 1 is a side elevation showing my improved device applied to a conventional type of split wheel rim, Figure 2 is a detail perspective view showing the type of rim engaging clamp employed, Figure 3 is a fragmentary longitudinal section taken through the outer end portion of one of the clamp arms, the view particularly showing one of the bearings for the contracting screw of the device, Figure 4 is a perspective view showing the device on an enlarged scale, and Figure 5 is a fragmentary longitudinal sectional view showing the mounting of the center clamp.

In carrying the invention into effect, I employ coacting clamp arms 10 and 11 respectively. Each of these arms is, as particularly shown in Figure 4 of the drawings, formed of resilient top and bottom sheet metal strips bent into overlapping relation, the top strips being somewhat shorter than the bottom strips and being secured at their ends to the bottom strips. The top and bottom strips of the arm 11 are, adjacent the inner end of said arm, separated to freely receive the inner end of the arm 10 therebetween, the arms being swingingly connected at their adjacent extremities by a suitable pivot pin 12. At their outer ends the arms are equipped with rim engaging clamps. Corresponding members 13 of these clamps are formed by bending the bottom strips of the arms and mounted to coact with the members 13, are opposite corresponding clamp members 14. The bottom strips of the clamp arms are, adjacent their outer ends formed with spaced laterally directed guide sleeves 15 while the clamp members 14 are equipped with spaced lateral guide lugs or pins 16 freely received through said sleeves for thus slidably connecting the clamp members 14 with the clamp members 13. Journaled upon the clamp members 14 are clamp screws 17 which are provided with winged heads and are threaded through the bottom strips of the clamp arms so that these screws may thus be readily rotated manually for tightening or releasing the clamps.

Adjacent their outer ends the top strips of the arms are bent up to form bridge pieces 18 lying substantially parallel to the bottom strips of the arm and pivotally mounted between these bridge pieces and said bottom strips are bearings 19. At their ends the bearings are, as shown in detail in Figure 3 of the drawings, provided with trunnions 20 engaging through the strips and received by reinforcing plates riveted or otherwise secured thereto. Extending freely through the bearing of the arm 10 and threaded through the bearing of the arm 11 is a clamp screw 21 provided adjacent opposite sides of said first mentioned bearing with suitable stop collars. At its adjacent end, the clamp screw carries a crank 22 so that the screw may be readily rotated for swinging the arms either toward or away from each other.

Embracing the arms 10 and 11 at the bridge pieces 18 and disposed in front of the clamp screw 21, is a segmental cross arm 23. This arm, like the arms 10 and 11, is also preferably formed from a strip of suitable resilient sheet metal bent to form overlapping top and bottom plates spaced apart by the bridge pieces 18. At one end the cross arm is rigidly connected with the arm 10 by a rivet or other suitable fastening pin 24 and, if deemed necessary, a spacing sleeve 25 may be interposed between the bridge piece of the arm 10 and the bottom strip thereof to surround said pin. Adjacent their opposite ends the plates of the cross arms are provided with arcuate slots 26 and freely engaging through these slots is a headed guide pin 27 carried by the arm 11 and slidably connecting the outer end portions of said plates with the arm. Extending from between the plates at their outer ends is a brace rod 28 engaged with the pivot pin 12, this brace rod being thus adapted to rigidly support the cross arm.

Projecting from the cross arm medially thereof is a skeleton guide sleeve 29, the inner end of which is fitted between the plates of said arm and receives a spacing block 30. Securing the sleeve in position are rivets or other suitable fastening devices extending through said plates, the inner end of the sleeve and said block. Slidable within the sleeve is a block 31 upon the outer end of which is formed at its lower side, a fixed clamp member 32 with which coacts a movable clamp member 33. These clamp members 32 and 33 provide a rim engaging clamp corresponding to the clamp carried by each of the arms 10 and 11, the clamp member 32 being provided with spaced guide sleeves 34 which freely receive guide pins 35 upon the clamp member 33 while a clamp screw 36 adjustably connects this latter clamp member with the clamp member 32. Freely fitted through the inner end of the sleeve 29 and the block 30 is a clamp screw 37 having threaded engagement with the block 31. This clamp screw is, as shown in detail in Figure 5, held against longitudinal movement by spaced collars coacting one with the sleeve and the other with the block, and mounted upon the screw at its inner end is a crank 38.

In order that the operation of my improved device may be accurately understood, I have shown the device in connection with a conventional type of split demountable motor vehicle wheel rim 39. With the device in the position shown the clamp screw 21 is operated for slightly spreading the arms 10 and 11 so as to separate the rim ends, when the clamp screw 37 is turned by its crank 38 for drawing in one end of the rim out of register with the other rim end, in the manner suggested in dotted lines in Figure 1. The clamp screw 21 may then be operated for drawing the arms 10 and 11 together and consequently shifting the rim ends into overlapping relation for contracting the rim. When so contracted it will be seen that a tire may be readily placed upon or removed from the rim. I accordingly provide a very simple structure for the purpose set forth and, at the same time, a device which may be quickly used in connection with substantially and conventional type of demountable wheel rim.

Having thus described the invention, what is claimed as new is:

1. A rim tool including coacting pivotally connected arms, rim engaging means carried thereby, a cross arm fixed upon one of said pivoted arms and having slidable connection with the other, rim engaging means carried by said cross arm and adjustably shiftable radially with respect to the axis of said pivoted arms, and means for adjustably swinging the pivoted arms.

2. A rim tool including pivotally connected arms each formed of overlapping top and bottom plates, bridge pieces formed from the top plates to lie in spaced relation to the bottom plates, bearings rotatably mounted between said bridge pieces and the bottom plates, a clamp screw carried by said bearings and operable for shifting the arms toward or away from each other, rim engaging means carried by the arms, and rim engaging means supported in a plane between the arms and adjustably shiftable radially with respect to the axis thereof.

3. A rim tool including coacting pivotally connected arms formed of overlapping top and bottom plates, clamp members formed from the bottom plates of said arms, clamp members carried by the bottom plates to coact with said first mentioned clamp members for connecting the arms at their outer ends with a rim, means extending between the arms and adjustable for swinging the arms toward or away from each other, and rim engaging means supported in a plane between the arms and adjustable radially with respect to the axis thereof.

4. A rim tool including pivotally connected arms, rim engaging means carried thereby, means for adjustably swinging the arms toward or away from each other, a cross arm extending between said first mentioned arms, a sleeve carried by said cross arm, a rim engaging clamp slidably supported by said sleeve, and means coacting between the clamp and sleeve for adjustably shifting said clamp radially with respect to the axis of the pivoted arms.

5. A rim tool including pivotally connected arms diverging toward their outer ends, rim engaging means carried by the outer end portions of the arms, a cross arm extending between the outer end portions of the arms, rim engaging means shiftable upon said cross arm radially with respect to the axis of the pivoted arms, and means for swinging said first mentioned arms.

In testimony whereof I affix my signature.

GEORGE V. SEARS. [L. S.]